April 24, 1951  W. R. YOUNG ET AL  2,550,632
ANTITELESCOPING SAFETY DEVICE FOR SEMITRAILERS
Filed May 18, 1948  2 Sheets-Sheet 2
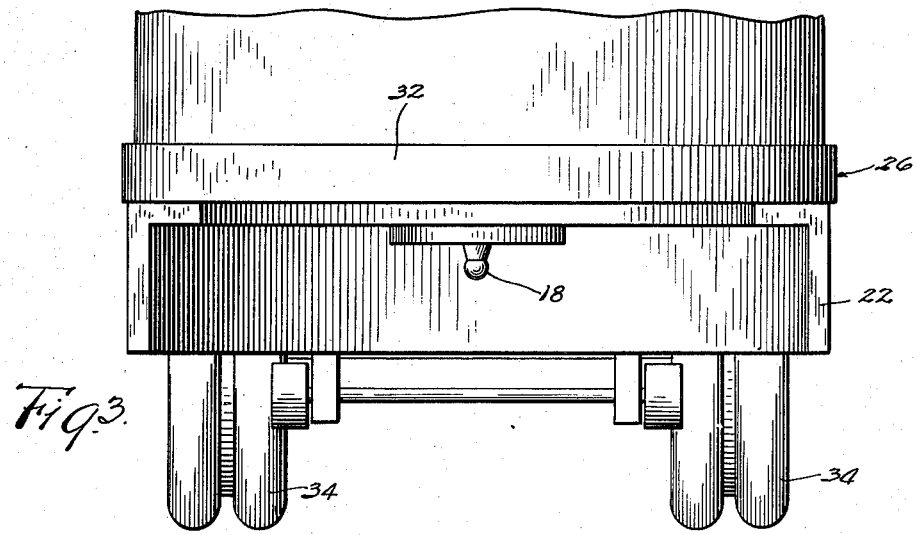
Fig. 3.
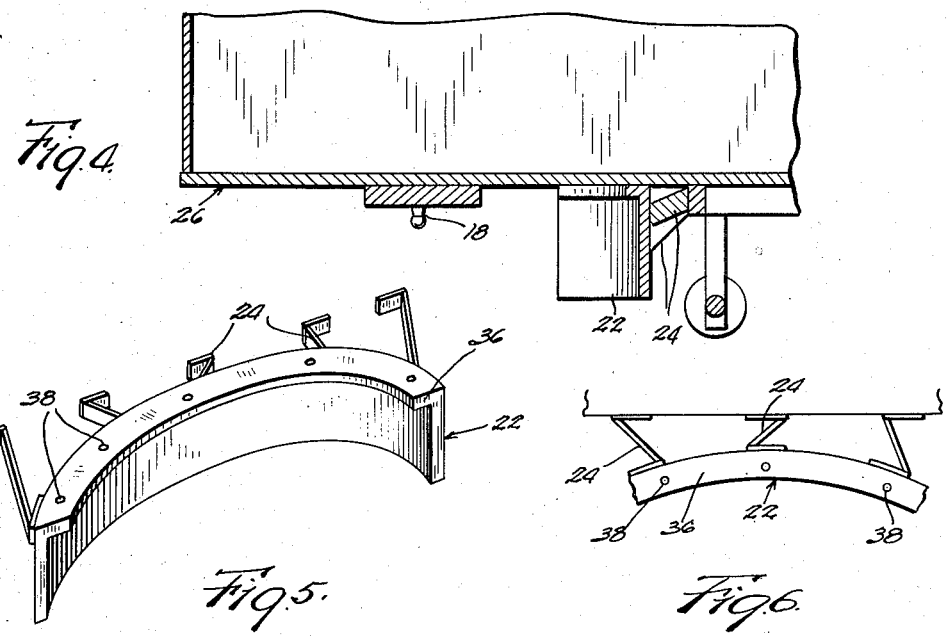
Fig. 4.
Fig. 5.
Fig. 6.
INVENTOR.
William R. Young.
BY: James W. Bickel.
Thiess, Olson & Mecklenburger
Attys.

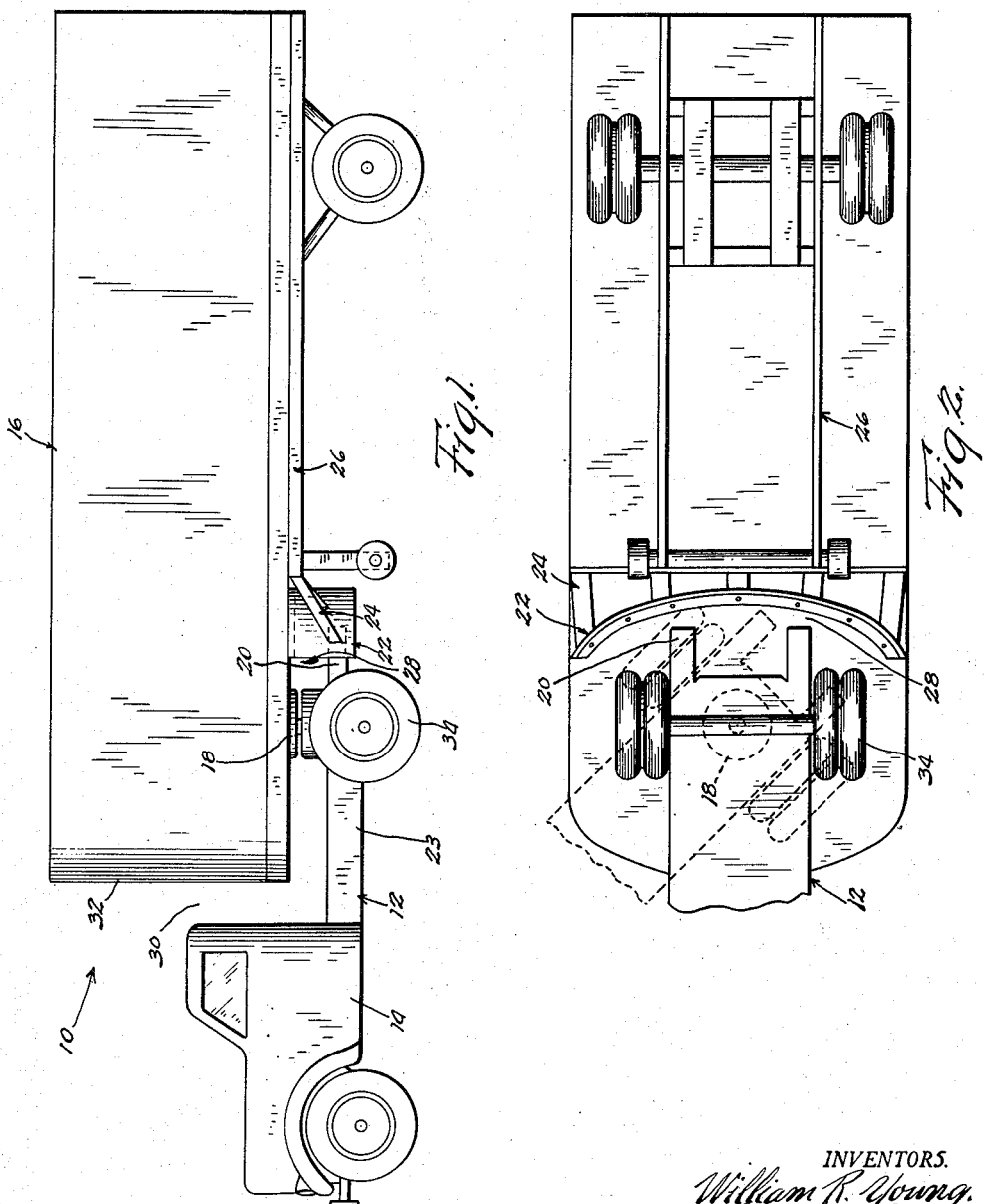

Patented Apr. 24, 1951

2,550,632

UNITED STATES PATENT OFFICE 2,550,632

ANTITELESCOPING SAFETY DEVICE FOR SEMITRAILERS

William R. Young, Michigan City, and James M. Bickel, La Porte, Ind.

Application May 18, 1948, Serial No. 27,788

2 Claims. (Cl. 280—33.05)

This invention relates to a safety device and more particularly to an anti-telescoping device for semi-trailer carriers and the like.

With the increase in the speed of travel of such carriers and the volume and weight of freight hauled thereby, the danger in a collision of a semi-trailer unit telescoping into the driver's cab mounted on a towing unit has created a serious hazard in the employment of this mode of transporting freight. The paramount concern of those engaged in such a business has always been in regard to the personal safety of the driver operating such a carrier, the safety of the cargo while being transported, and the safety of the carrier equiment itself.

In most types of semi-trailers, a fifth wheel arrangement comprising the pivotal connection between the towing and semi-trailer units is employed but it has not been found to be sufficiently rigid and strong to prevent telescoping in the event of a collision. It seems that when the semi-trailer is involved in a collision, the impact causes the trailer to continue in its movement and shear the U-bolts holding the fifth wheel to the rear frame of the towing unit, thus resulting in a telescoping of the trailer with the cab of the towing unit.

It is, therefore, one object of this invention to provide a safety device which will prevent telescoping of the units in the event the U-bolts holding the pin of the pivotal connection of the fifth wheel is sheared in a collision.

It is a further object of this invention to provide a safety device which will prevent telescoping of the trailer and the towing unit regardless of their relative angular positions.

It is a still further object of this invention to provide a device which will give added safety to the cargo transported, the carrier equipment itself, and the driver of such carrier.

It is a still further object of this invention to provide an anti-telescoping device which is simple in construction, effective in operation, and inexpensive to produce.

Further and additional objects will appear from the description, accompanying drawings, and appended claims.

In accordance with one embodiment of this invention, an anti-telescoping device is provided for a semi-trailer carrier comprising a bumper member, which is arcuate in shape and which is mounted on the underside of the semi-trailer unit, and bracing elements extending from said bumper member to the chassis of said semi-trailer unit. The spacing between the rear end of the towing unit and the bumper member is less than the spacing between the forward end of the semi-trailer unit and the driver's cab mounted on the towing unit. Thus, when one of the units starts to telescope into the other, the rear end of the towing unit strikes the bumper member and thus prevents damage caused by the further telescoping of the units. The arcuate form of the bumper member insures that the spacing between the rear end of the towing unit and the bumper member is at all times less than the spacing between the forward end of the trailer unit and the driver's cab.

For a more complete understanding of this invention reference should be had to the drawings, wherein:

Figure 1 is a side elevational view of a semi-trailer carrier;

Fig. 2 is a fragmentary bottom view of the carrier shown in Fig. 1, and showing in dotted lines the towing unit in an angularly disposed relation with respect to the trailer unit;

Fig. 3 is an elevational view of the front end of the trailer unit;

Fig. 4 is a fragmentary sectional view of the trailer unit taken along line 4—4 of Fig. 2;

Fig. 5 is a perspective view of the bumper member and the bracing elements; and

Fig. 6 is a detail view also illustrating the bracing elements.

Referring now to the drawings, and more particularly to Fig. 1, a heavy-duty, single-axle, semi-trailer carrier 10 is there shown comprising a towing unit 12 having a driver's cab 14 mounted thereon, and a semi-trailer unit 16 pivotally connected at 18 to the rear end 20 of said towing unit 12. Mounted on the underside of the trailer unit 16 and spaced rearwardly from the rear end 20 of the towing unit 12 is a bumper member 22, arcuate in shape and extending substantially the width of the trailer unit 16. Bumper member 22 projects downwardly below the lower edge of rear end 20 of the towing unit chassis 23, as shown in Fig. 1, and is constructed preferably of heavy iron plate sufficiently strong and sturdy to withstand the impact of the telescoping trailer or towing unit when the carrier is involved in a collision. Bracing elements 24 extend rearwardly from the bumper member 22 to the chassis 26 of the trailer unit 16 to reinforce said bumper member. Bracing elements 24 are fastened by welding or any other suitable means to the bumper member 22 and to the chassis 26, and may be of Z cross section for strengthening as illustrated in Fig. 6.

The space 28 between the rear end 20 of the towing unit chassis 23 and the arcuate bumper member 22 is less than the space 30 between the forward end 32 of the trailer unit 16 and the cab 14 mounted on towing unit 12. Thus, when the pivotal connection 18 is severed by a sudden forward movement or jolt of the trailer unit 16, the rear end 20 rams bumper member 22, and prevents the forward end 32 of the trailer unit 16 from ramming into the cab 14 and inflicting serious damage to the carrier and the cargo, and injury or death to the driver.

The arcuate shape of bumper member 22 insures that the spacing between the rear end 20 of the towing unit 12 and the bumper member 22 will at all times be less than spacing 30, regardless of the relative positions of the towing unit 12 and the trailer unit 16. Sufficient clearance is provided between the rear drive wheels 34 of the towing unit 12 and the bumper member 22 so that the towing unit 12 may assume any angular position when turning, as shown in Fig. 2. Bumper member 22 is provided with a forwardly projecting lip 36 (Fig. 5) at its upper end having a plurality of bolt holes 38 so as to enable said member to be readily secured to the underside of the chassis 26 by bolts.

Thus, it will be seen that an anti-telescoping safety device has been provided which will be effective in operation regardless of the relative positions of the towing unit and the trailer unit. Also, a safety device has been provided which insures greater safety to the cargo when being transported and the carrier equipment, and which, at the same time, affords greater personal safety to the driver of such carrier.

While a particular embodiment of this invention is shown above, it will be understood, of course, that the invention is not to be limited thereto, since many modifications may be made, and it is contemplated, therefore, by the appended claims to cover any such modifications as fall within the true spirit and scope of this invention.

We claim:

1. The combination of a towing unit having a driver's cab mounted thereon, a trailer unit pivotally connected to said towing unit and spaced from said cab, and means for preventing telescoping of said units, said means comprising a downwardly projecting bumper member lying in the path of said towing unit and being attached to the chassis of said trailer unit, there being a plurality of bracing elements extending rearwardly from said bumper member to said trailer chassis, the spacing between the rear end of said towing unit and said bumper member being less than the spacing between the front end of said trailer unit and said cab.

2. The combination claimed in claim 1 in which the bumper member extends substantially the width of said trailer chassis and is of such arcuate form as to maintain the spacing between the rear end of said towing unit and said bumper member at all times less than the spacing between the front end of said trailer unit and said cab.

WILLIAM R. YOUNG.
JAMES M. BICKEL.

REFERENCES CITED

The following references are of record in the file of this patent:

UNITED STATES PATENTS

| Number | Name | Date |
|---|---|---|
| 2,002,832 | Robinson | May 28, 1935 |
| 2,066,430 | Swift | Jan. 5, 1937 |